United States Patent [19]

Fukushima

[11] Patent Number: 5,150,219
[45] Date of Patent: Sep. 22, 1992

[54] ELECTRONIC CAMERA WHEREIN THE NONRECORDING HEAD MOVING PERIOD IS A MULTIPLE OF THE VERTICAL SYNCHRONIZING PERIOD

[75] Inventor: Nobuo Fukushima, Yokohama, Japan

[73] Assignee: Canon Kabushiki Kaisha, Tokyo, Japan

[21] Appl. No.: 425,606

[22] Filed: Oct. 23, 1989

[30] Foreign Application Priority Data

Oct. 31, 1988 [JP] Japan ................. 63-276868

[51] Int. Cl.$^5$ .................... H04N 5/76; H04N 5/225
[52] U.S. Cl. ................... 358/335; 358/906; 358/909
[58] Field of Search ........... 358/335, 906, 909, 310, 358/213.13, 213.31, 213.19; 360/33.1, 35.1

[56] References Cited

U.S. PATENT DOCUMENTS

| | | | |
|---|---|---|---|
| 4,517,611 | 5/1985 | Kimura | 360/35.1 |
| 4,563,715 | 1/1986 | Kawamura et al. | 360/78 |
| 4,622,596 | 11/1986 | Suga et al. | 358/335 |
| 4,641,215 | 2/1987 | Katoh et al. | 358/906 |
| 4,658,304 | 4/1987 | Tsunekawa et al. | 358/909 |
| 4,739,417 | 4/1988 | Ogawa | 358/906 |
| 4,816,937 | 3/1989 | Fukushima | 360/73.03 |
| 4,896,226 | 1/1991 | Araki et al. | 358/906 |

*Primary Examiner*—Roy N. Envall, Jr.
*Assistant Examiner*—Thai Tran
*Attorney, Agent, or Firm*—Fitzpatrick, Cella, Harper & Scinto

[57] ABSTRACT

An electronic camera for recording an image of an object on a recording medium using a head and an imaging device. The camera has an electronic shutter pulse generation circuit for electronically reading out a signal stored in the imaging device within a short time. The camera also has a head moving mechanism for moving the head relative to the medium, where the time required for moving the head to the next tract after recording is arranged to be within a period equal to an n multiple (n is an integer) of a vertical synchronizing period of a video synchronizing signal.

23 Claims, 10 Drawing Sheets

ELECTRONIC CAMERA WHEREIN THE NONRECORDING HEAD MOVING PERIOD IS A MULTIPLE OF THE VERTICAL SYNCHRONIZING PERIOD

BACKGROUND OF THE INVENTION

1. Field of the Invention

This invention relates to an electronic camera having an electronic shutter function and capable of performing high-speed successive photographing operations.

2. Description of the Prior Art

Heretofore, most of electronic still-picture cameras for recording an image of an object on a magnetic sheet using a CCD and the like use mechanical shutters like cameras using silver-salt films. When performing successive photographing operations in such an electronic camera, there is generally used a sequence in which, after exposure has been performed by driving a shutter, a stepping motor or the like is driven for moving a head to the next track, and, after terminating the movement of the head, the shutter is recharged to prepare for the next photographing operation.

In the case of using such a mechanical shutter, however, its operation time is not constant due to differences in shutter mechanism between cameras, different power-supply voltages, ambient temperature, humidity and the like. Furthermore, the fact that the operation time itself is long is an obstacle in performing high-speed successive photographing operations and the like.

Taking into consideration the problems as described above, the use of an electronic shutter by means of electronic control of an imaging device, such as a CCD or the like, instead of a mechanical shutter is effective as means for increasing successive photographing speed.

In a conventional electronic camera, however, an electronic shutter pulse is output in accordance with a shutter release, and, after having thereby once cleared the electric charges stored in the CCD, exposure is performed. Recording is then performed, and the head is moved to the next track.

After the completion of the movement of the head, an electronic shutter pulse is output by catching the next vertical synchronizing signal $V_s$, and subsequently the same operation is repeated.

Figure 7:
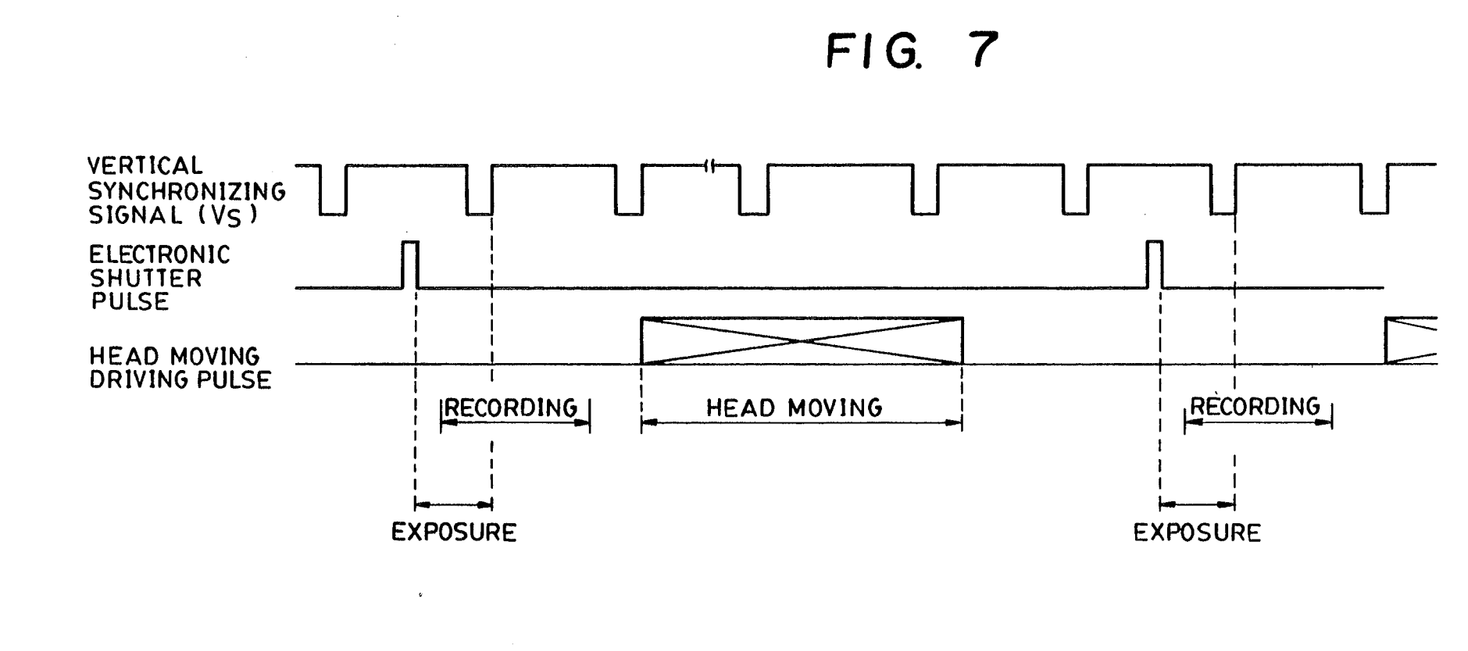
FIG. 7 is a diagram showing an example of the operation of a conventional electronic camera.

The operation is illustrated in FIG. 7. That is, since the moving period of the head is not particularly considered for the electronic shutter operation, the timing of the $V_s$ signal has already passed when the movement of the head is completed. Hence, there is a waste of time such that it is necessary to wait for another $V_s$ in order to output the next electronic shutter pulse. This results in the disadvantage that the successive photographing speed does not become very high.

SUMMARY OF THE INVENTION

In an embodiment of the present invention, in order to reduce the time wasted until an electronic shutter pulse is output after the movement of the head, the moving period of the head (exclusive of the time during recording) is determined to be within a period equal to a multiple of n (n is an integer) of a vertical synchronizing period.

Furthermore, the timing of outputting the electronic shutter pulse is made to overlap with the moving period of the head.

According to one aspect of the invention, an electronic camera which records images on a recording medium using a moving head and an imaging device includes an electronic pulse generation circuit for electronically reading out a signal stored in the imaging device in a first period of time. Head moving apparatus is provided for moving the head relative to the medium. Control circuitry controls the head moving apparatus so that a time required for moving the head to a subsequent track after recording is within a second time period equal to n times a vertical synchronizing period of a video synchronizing period of a video synchronizing signal, where n is an integer.

According to a further aspect of the invention, an electronic camera which records images on a recording medium using a moving head and an imaging device includes electronic pulse generation circuitry for electronically reading out a signal stored in the imaging device in a first period of time. Head moving apparatus is provided for moving the head relative to the medium. Control circuitry is provided for causing an exposure period of the electronic pulse generation circuitry to overlap with a second period of time during which the head moving apparatus moves the head to a subsequent track.

According to another aspect of the present invention, an electronic camera for recording on a recording medium using a moving head, an image signal of an object obtained from an imaging device according to a reference signal having a predetermined period includes a control circuit for causing the moving head to record on the recording medium an imaging signal for one frame of the object within said predetermined period. The control circuit also causes the head to be moved to a next recording position within a period equal to n times said predetermined period, where n is an integer.

According to yet a further aspect of the present invention, an electronic camera includes an imaging device for converting an imaging light of an object into an electrical image signal. A head records the image signal on a recording medium, and setting circuitry is provided for setting a predetermined period required for recording an image signal for one frame of the object. Timing control circuitry is provided for controlling a recording timing of said image signal in accordance with the setting circuitry. Moving apparatus is provided for moving the head to a next recording position within a period equal to n times the predetermined period, where n is an integer.

It is thereby possible to realize an increase in the successive photographing speed.

Other objects and features of the present invention will become more apparent from the following description made in reference to the drawings.

DETAILED DESCRIPTION OF THE PREFERRED EMBODIMENTS

Figure 1:
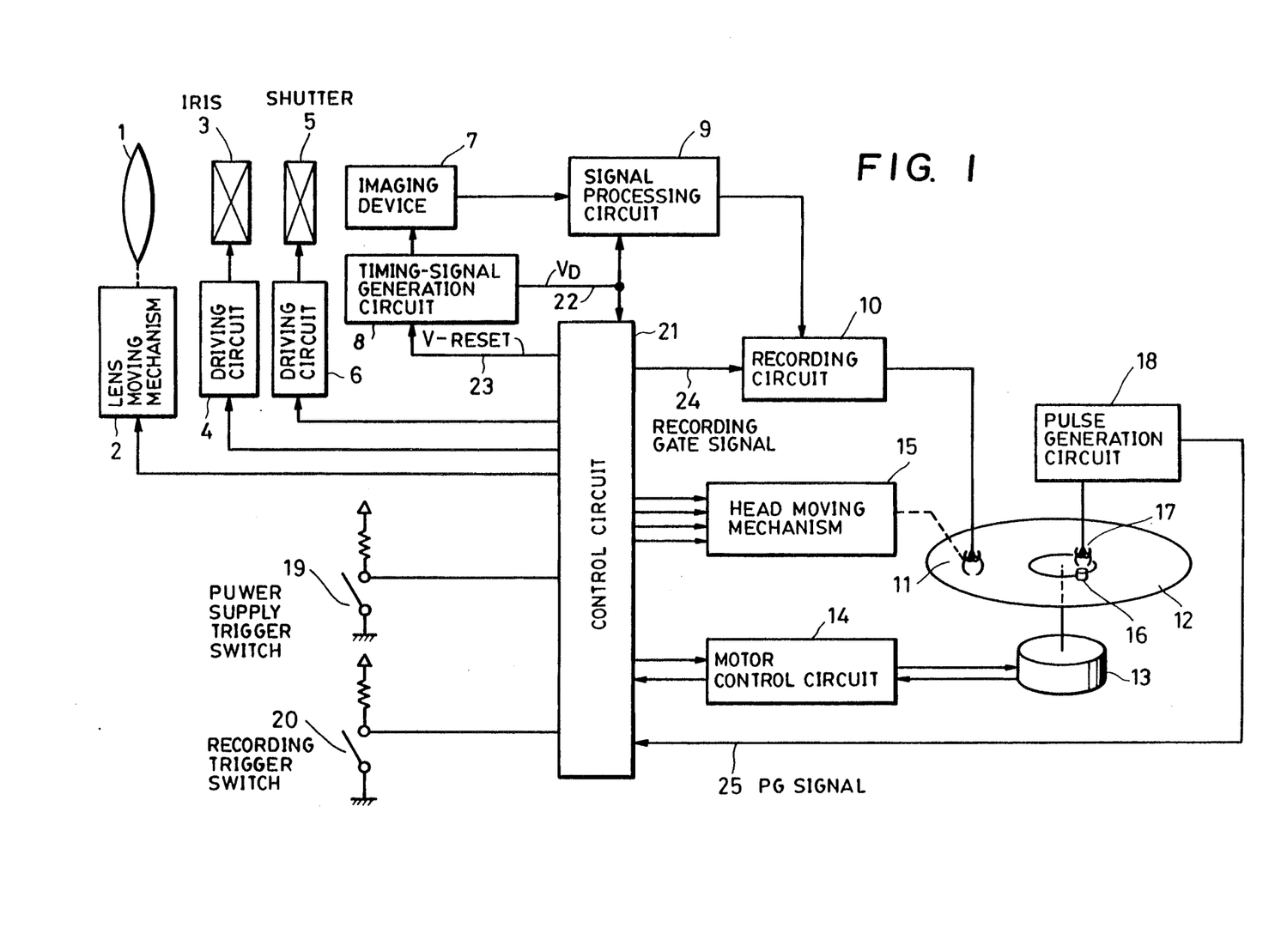
FIG. 1 is a block diagram of an embodiment of the present invention.

FIG. 1 is a block diagram of an embodiment of the present invention.

In FIG. 1, there are shown a lens 1, a lens moving mechanism 2 for moving the lens 1 to switch its focal length between Tele or Wide, an iris mechanism 3, an iris driving circuit 4, a shutter mechanism 5, a shutter driving circuit 6, and an imaging device 7, such as a CCD or the like. A timing-signal generation circuit 8 generates timing pulses for driving the imaging device 7, and video synchronizing signals and the like. A signal processing circuit 9 performs signal processing, such as gamma correction, blanking processing, addition of synchronizing signals and the like, for the signals output from the imaging device 7. A recording circuit 10 performs modulation for converting the signal processed by the signal processing circuit 9 into a form suitable to be recorded on a magnetic sheet, and the like. There are also shown a magnetic head 11, a video floppy disk 12, that is, a magnetic sheet. A motor 13 is also provided for rotating the magnetic sheet 12. A motor control circuit 14 rotates the motor 13. A head moving mechanism 15 (e.g. a stepping motor) moves the magnetic head 11 in the direction of the radius of the magnetic sheet to change recording tracks. A PG pin 16 (e.g. a magnet) is buried in a centercore portion of the video floppy disk. A PG coil 17 detects the position of the PG pin 16 in accordance with the rotation of the magnetic sheet. A pulse generation circuit 18 performs wave shaping of the output of the PG coil 17, and generates a pulse for every rotation of the magnetic sheet. There are also shown a power supply trigger switch 19, and a recording trigger switch 20. A control circuit 21 includes a microcomputer and controls the entire system.

A vertical synchronizing signal (termed hereinafter VD) 22 is output from the timing-signal generation circuit 8. A V-RESET signal 23 resets the timing-signal generation circuit 8 to adjust the rotation phase of the magnetic sheet with the phase of the VD signal. A recording gate signal 24 provides the timing of the start and stop of recording for the recording circuit 10. Recording is performed when the recording gate signal 24 is at a low level, and recording is stopped when the recording gate signal 24 is at a high level. A PG signal 25 is an output signal of the pulse generation circuit 18, and is output with a timing so that the head is at the position for the start of recording on the magnetic sheet when the PG signal rises from low to high.

Now, the operation of the FIG. 1 embodiment will be explained with reference to FIGS. 2–5. First, if the power supply trigger switch 19 is turned off at step S1, the process proceeds to step S14, where it is checked whether or not the shutter is closed. If closed, the process proceeds to S16. If not closed, the shutter is driven and closed at S15, and the process then proceeds to S16. After waiting for a predetermined time at S16, the process proceeds to S17, where the power supply is turned off, and the operation is terminated at S18.

Figures 2, 2A:
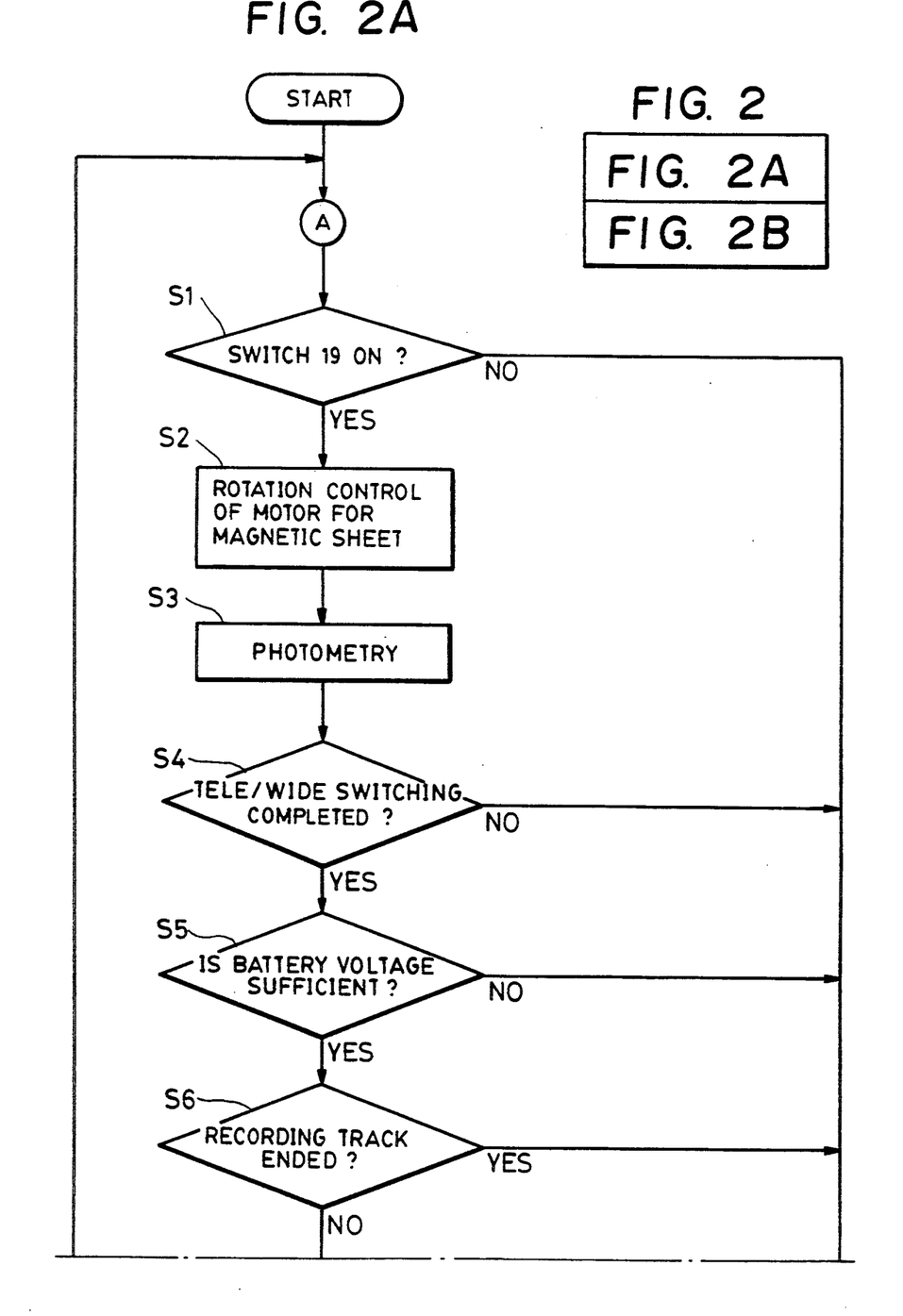
FIGS. 2 through 4 are flow charts of the FIG. 1 embodiment.
Figure 2B:
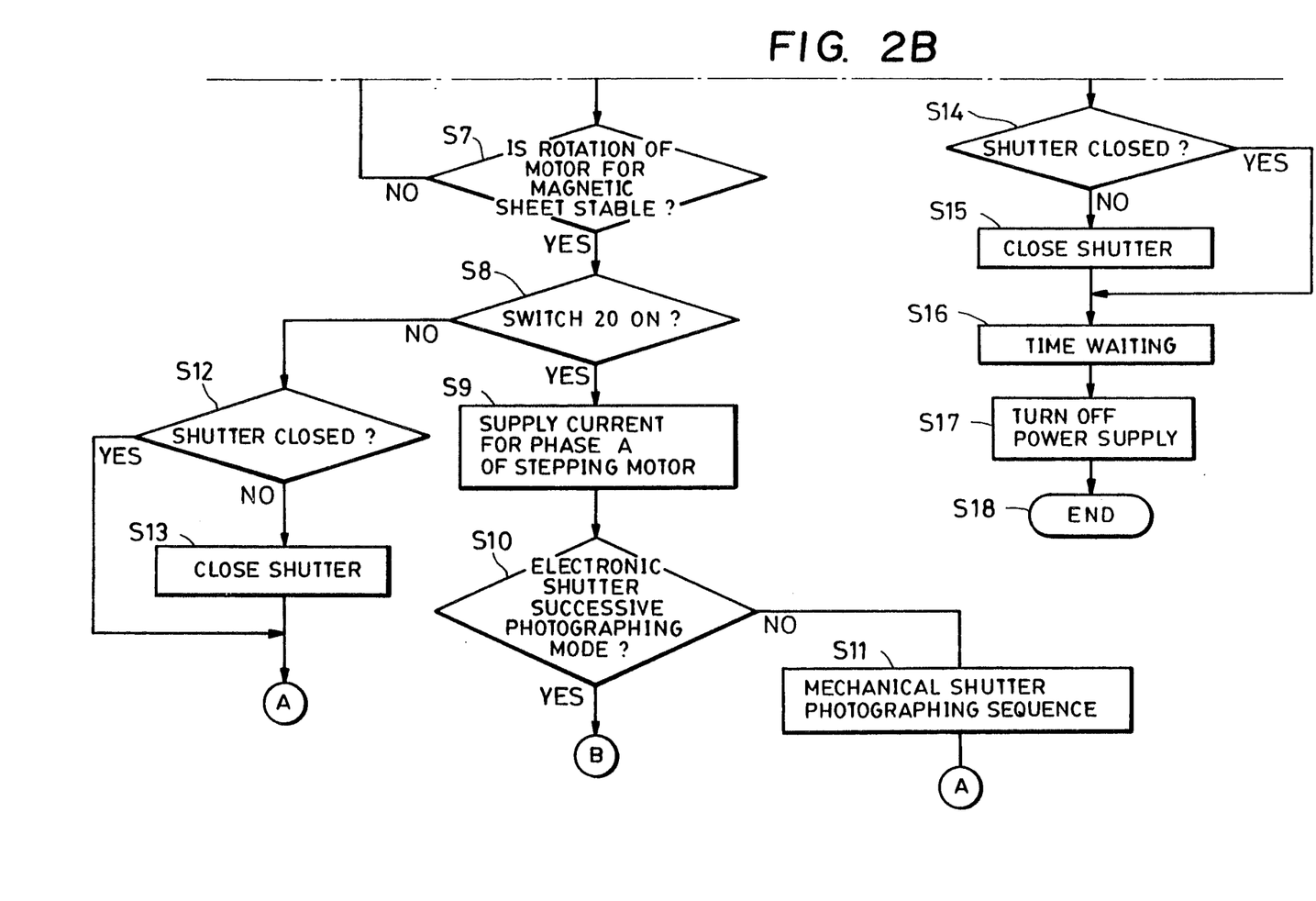

If the switch 19 is turned on at S1, the motor 13 for the magnetic sheet is subjected to rotation control at S2. Subsequently, photometry is performed at S3. According to the photometry, data for obtaining an iris value and a shutter speed which will be described later are provided.

It is then checked at S4 whether or not the switching operation between Tele/Wide (not illustrated) has been completed. If not completed, the process proceeds to S14. If completed, the process proceeds to S5.

At S5, it is checked whether or not the battery voltage is sufficiently high. If sufficiently high, the process proceeds to S6. If not sufficiently high, the process proceeds to S14.

At S6, it is checked whether or not the actual position of the head on a track of the floppy disk is at a position capable of subsequent recording. If capable, the process proceeds to S7. If not capable, the process proceeds to S14.

At S7, it is checked whether or not the rotation of the motor 13 for the magnetic sheet becomes stable. If not stable, the process returns to (A). If stable, the process shifts to S8. If the switch 20 is turned off at S8, the process shifts to S12. If the shutter has already been closed at S12, the process returns to (A). If not closed, the shutter is closed at S13 and the process returns to (A). If the switch 20 is turned on at S8, current is supplied for phase A of the head moving mechanism 15, e.g. a stepping motor, for driving the head at S9. It is assumed that the stepping motor has 4 current-supplying phases, that is, phase A, phase B, phase C and phase D. When driven once in the descending order of A, B, C and D, the head moves toward the inner circumference by one track. It is also assumed that the head is just on a recording track when current is supplied for phase A.

Figure 3:
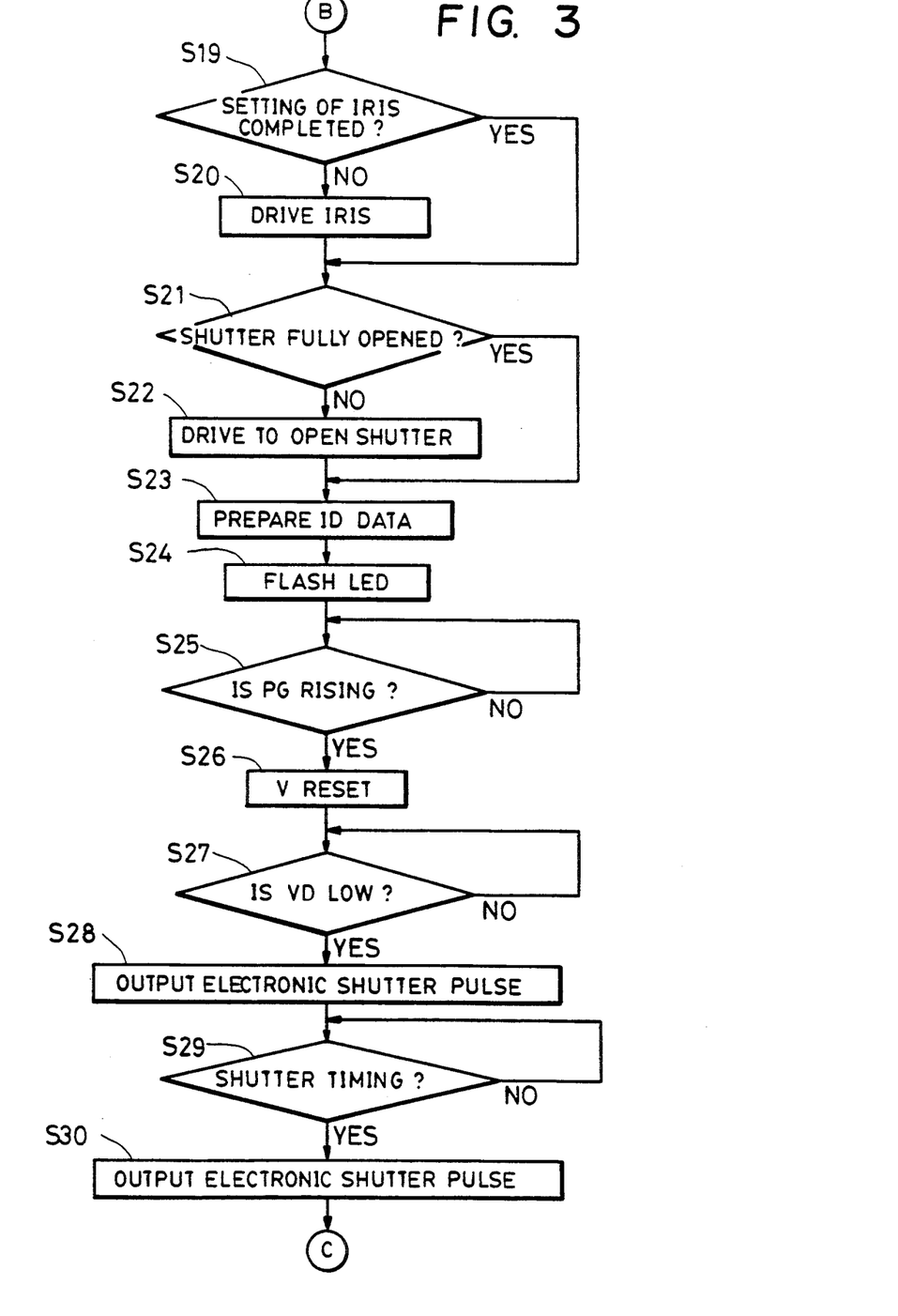

If the photographing mode is an electronic shutter mode at S10, the process proceeds to (B) (FIG. 3). If not an electronic shutter mode, a mechanical shutter photographing sequence is executed at S11 and the process then returns to (A). Since the mechanical shutter photographing sequence at S11 uses a usual mechanical shutter and is identical to that in a conventional case, a detailed explanation thereof will be omitted.

At S19 and S20 in (B) (FIG. 3), the iris is driven toward a proper iris value according to the result of the photometry at S3. If the situation is already after the second successive photographing operation at the moment of S19 and setting of the iris has been completed, the process proceeds to S21. If the situation is the first photographing operation and the like and setting the iris has not been completed, the iris is driven toward a proper value at S20. Then, at S21 and S21, the shutter is fully opened. If the situation is after the second successive photographing operation and the shutter has already been fully opened, the process proceeds to S23. If the situation is the first successive photographing operation and the shutter has not been fully opened yet, the shutter is driven and fully opened at S22.

Then, at S23, ID data are prepared. For example, date, time and the like are read from a watch (not illustrated), numeral data which the user has arbitrarily set, iris values and shutter speeds during photographing operations are read, and these data are converted into data based on a still-video format.

Then, at S24, an LED or the like provided within or outside the finder flashes in order to indicate a photographing operation is being performed in the electronic shutter successive photographing mode. The flashing may be performed by alternately turning on and off light every time a few frames have been photographed, or by repeatedly turning on and off light at a predetermined time interval. At S25, the leading edge of the PG signal is waited for. It is assumed that the output of the PG signal detection circuit rises when the head just reaches the position to start recording during rotation of the floppy disk. When the PG signal rises, the timing-signal generation circuit 8 is reset by the V-RESET signal generated from the control circuit 21 and the VD signal is output at a predetermined time thereafter at S26. The output VD signal of the timing-signal generation circuit 8 thereby synchronizes with the PG signal with a predetermined time difference (for example, 7 horizontal scanning periods).

Then, at S27, a timing in which the output VD signal of the timing-signal generation circuit 8 becomes a low level is waited for. When it becomes a low level, an electronic shutter pulse is output at S28. Electric charges which have been stored on the imaging device are thereby cleared.

Then, at S29, a shutter timing is waited for. The shutter timing is obtained from an iris value and a shutter speed calculated according to the result of photometry at S3.

The imaging device stores electric charges from one VD signal to the next VD signal. The electric charges are read at a televion rate. Accordingly, by counting the time from the preceding VD signal, the time until the next VD signal arrives and reading is perfomed is calculated.

When this time becomes equal to the shutter speed, an electronic shutter pulse is output at S30. Electric charges stored after the output of the electronic shutter pulse at S26 are thereby read out, and the imaging device is cleared. Accordingly, a signal made of electric charges actually stored during a period from the output of the electronic shutter pulse until the arrival of the next VD signal, that is, the shutter speed is obtained at S30.

Figure 4:
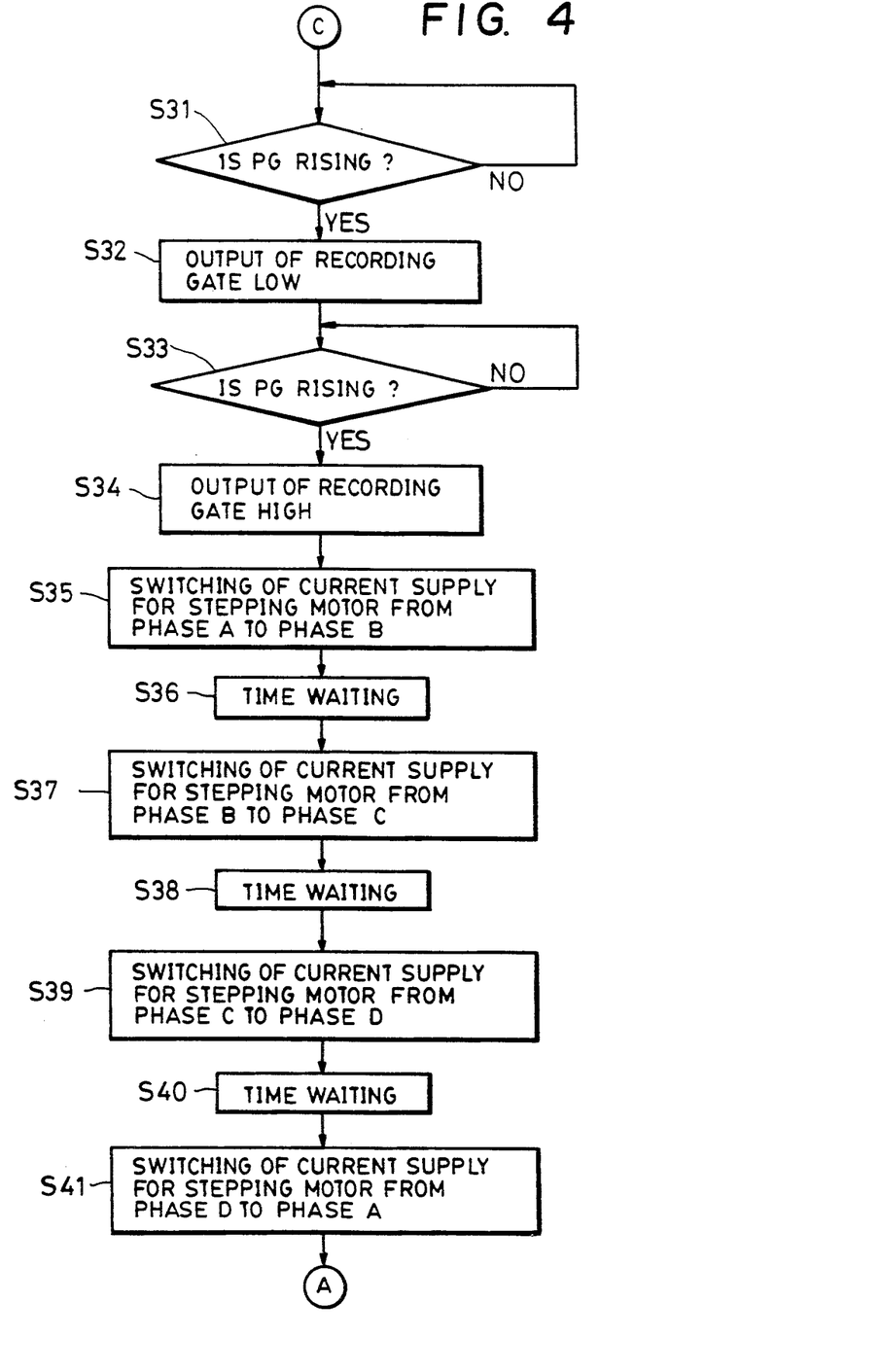

The rise of the PG signal is then waited for at S31 (FIG. 4).

When the PG signal rises, the head is at the position to start recording on the floppy disk, and hence the recording gate signal for the recording circuit is made a low level at S32. The recording circuit thereby starts recording.

When the PG rises at S33, the process shifts to S34, where the recording gate signal is made a high level to stop recording.

Current supply is then switched for phase B of the stepping motor in order to move the head to the next track at S35. A predetermined time is waited for at S36, and current supply is switched to phase C at S37. Similarly, a predetermined time is waited for at S38, and current supply is switched the phase D at S39. After waiting for a predetermined time at S40, current supply is switched to phase A at S41 and the process returns to Ⓐ.

Subsequently, photographing operations after the second successive photographing operation are executed with a sequence identical to that in the former photographing operations.

When current is supplied for phase A at S41, the head moves to the next recording track. However, the stepping motor more or less oscillates immediately after the switching of the current-supplying phase. Consequently, immediately after current has been supplied in phase A at S41, the head is oscillating in the direction of the radius of the floppy disk.

Now, the time until the next recording during successive photographing operations corresponds to one rotation of the motor for the magnetic sheet, that is, 1V period. Accordingly, this period is secured as the setting time until oscillation settles.

Figure 5:
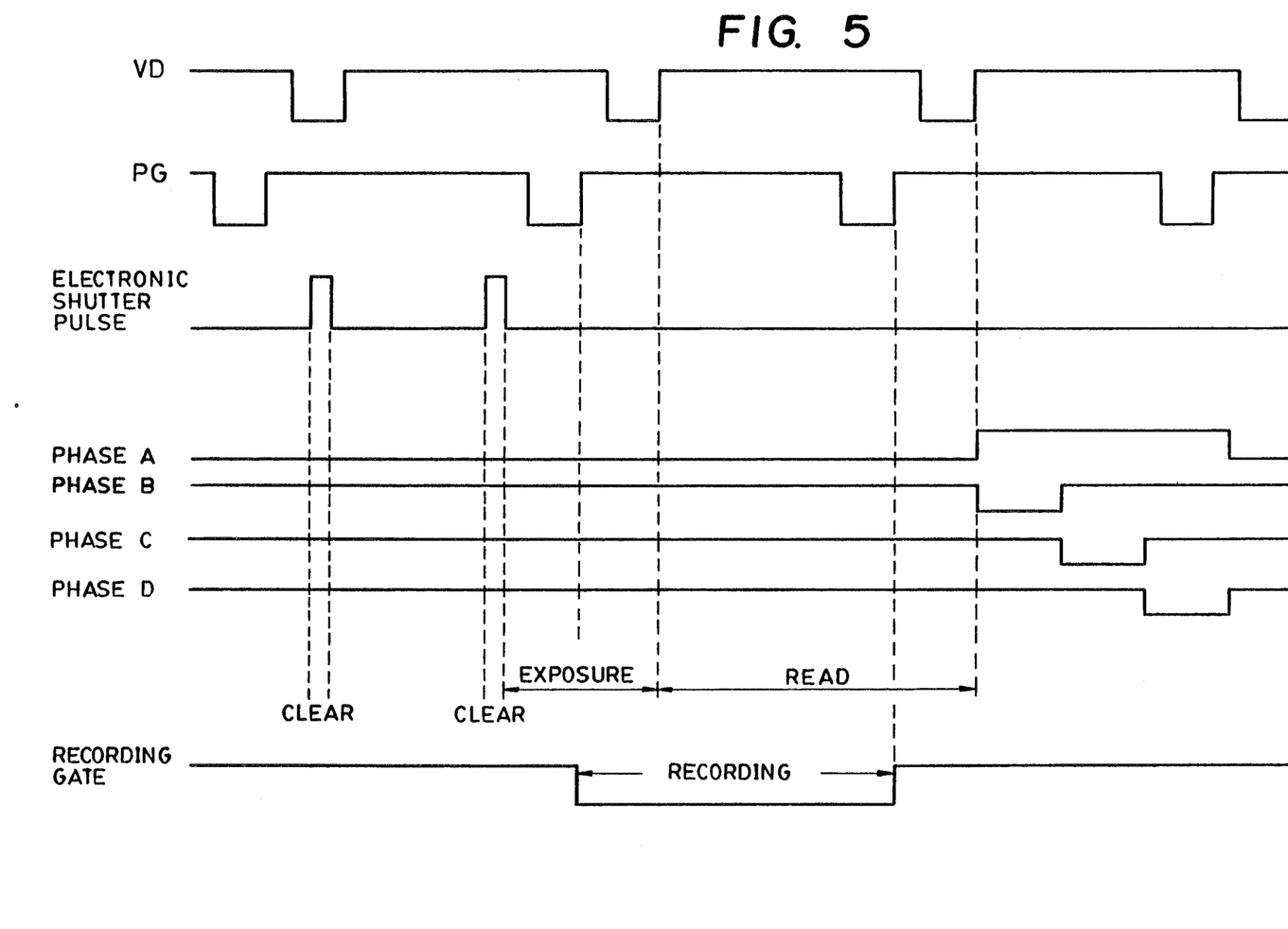
FIG. 5 is a timing chart of the FIG. 1 embodiment.

These operations are shown in timing charts of FIG. 5.

As shown in FIG. 5, the head moving period begins immediately upon completion of the recording operation. Head movement stops in conjuction with the completion of a vertical synchronizing signal VD.

Although, in the above-described embodiment, the non-recording movement time plus the settling time of the head is made a 2V period, it is also possible to perform photographing operations if the non-recording movement time plus the settling time of the head is made a 1V period.

In this case, the sequence until recording of the first frame in successive photographing operations may be executed as in FIGS. 2 and 3 like in the above-described embodiment. The procedure after Ⓒ is as shown in FIG. 6(a).

Figure 6:
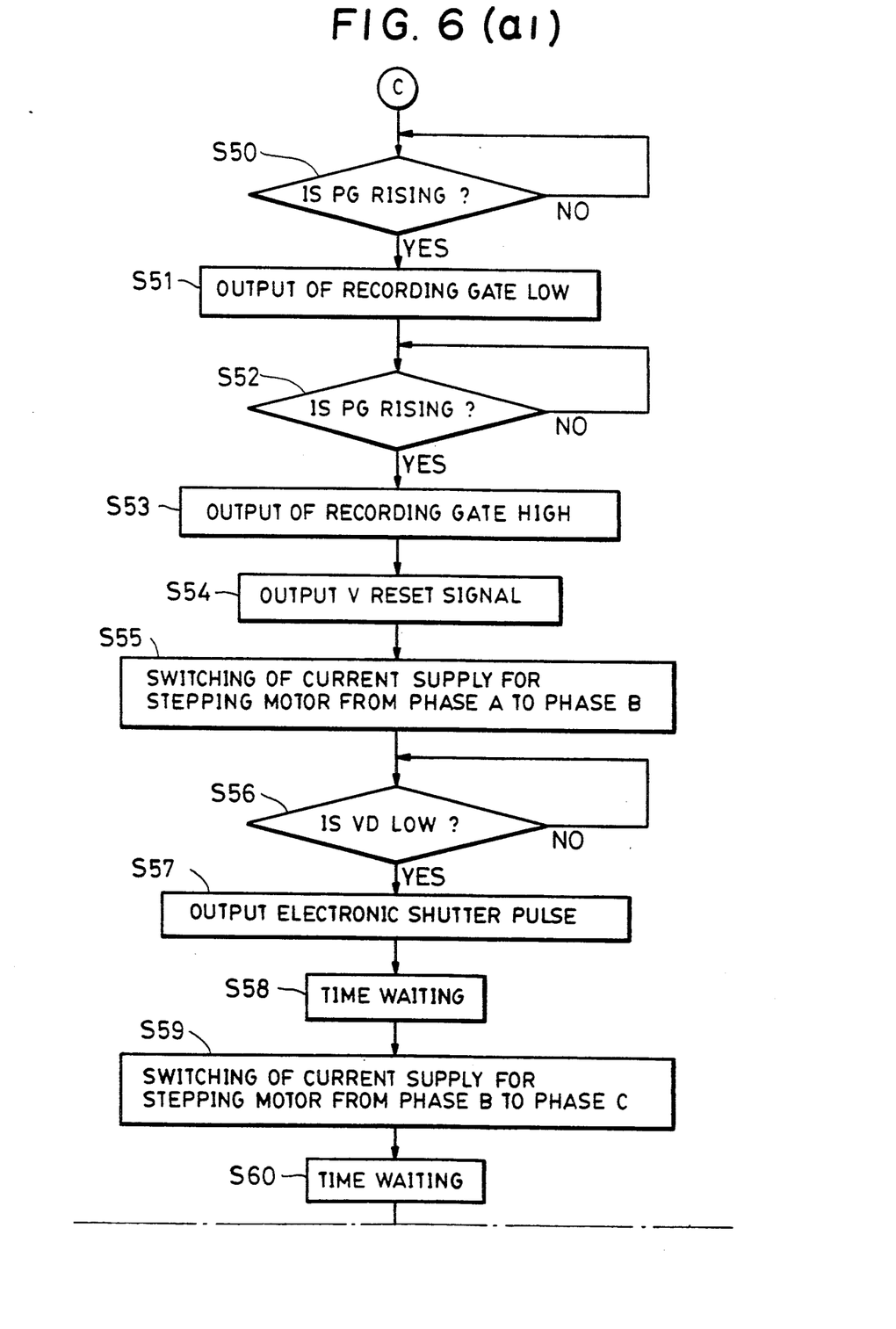
FIG. 6(a) is a flow chart of a second embodiment of the present invention.
FIG. 6(b) is a diagram showing an example of the operation of the FIG. 6(a) embodiment.
Figure 6A:
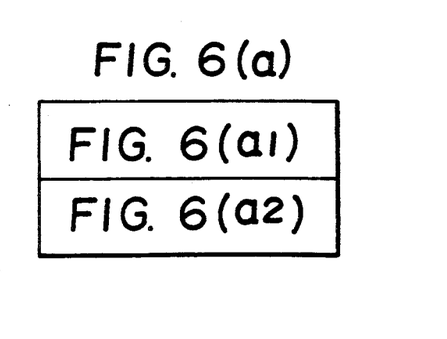

In FIG. 6(a), the procedure from S50 to S53 is identical to that from S31 to S34 in the above-described embodiment. The V-RESET signal is output at S54, and current supply for the stepping motor is switched from phase A to phase B at S55. Then, waiting is performed until the VD becomes at a low level at S56, and an electronic shutter pulse is output at S57.

At steps from S58 to S63, the current-supplying phase for the stepping motor is switched in the same manner as in the above-described embodiment. At steps from S64 to S67, switching between Tele and Wide, a check of the battery level, a check of the completion of a recording track, and a check of the switch 20 are performed in the same manner as at steps S4, S5, S6 and S8 in the above-described FIG. 1 embodiment, and the process then proceeds to S68.

At S68, ID data are prepared in the same manner as at S23. At S69, flashing of the LED is performed in the same manner as at S24. The process then returns to Ⓒ.

The output of an electronic shutter pulse corresponding to S29 and S30 in FIG. 3 is executed by an interrupt processing during execution of steps from S58 to S69.

Figure 6B:
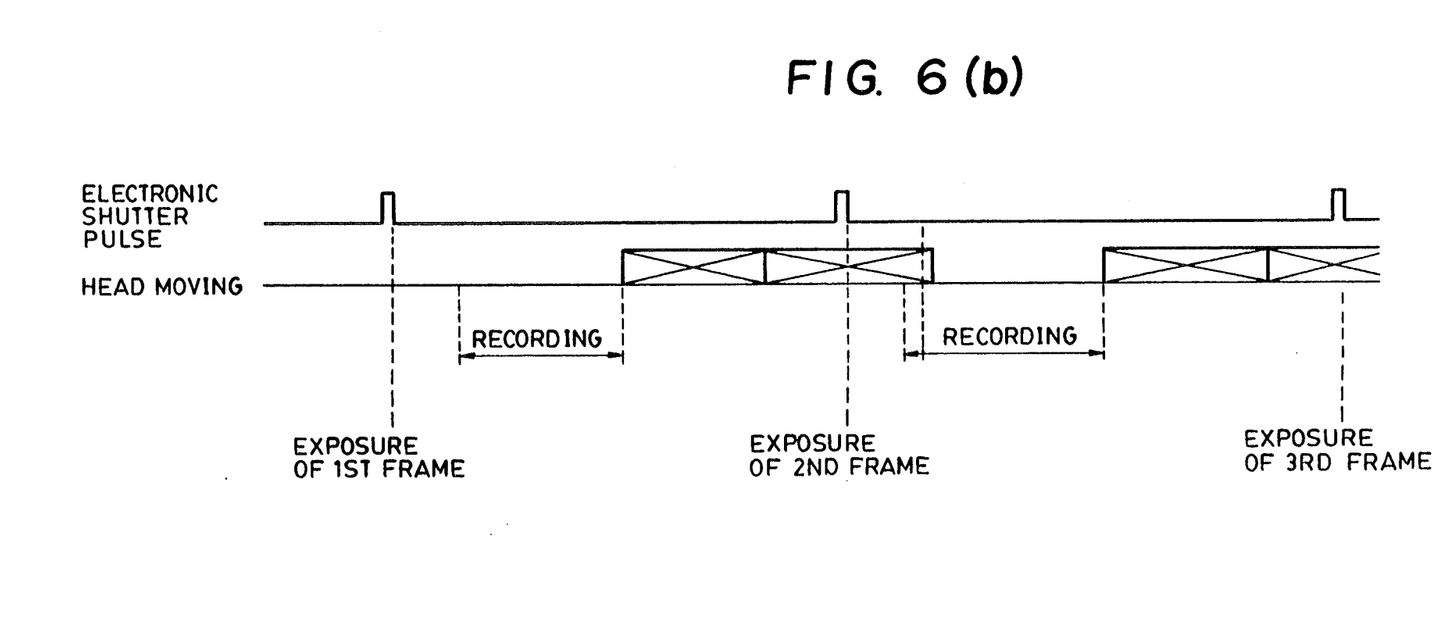

Operation timings of the present embodiment are illustrated in FIG. 6(b).

As is shown in FIG. 6(b), since it is possible to shorten the interval between exposure operations, the present embodiment is very effective for increasing the speed of successive photographing operations.

As explained above, the electronic camera of the present invention is configured so that the moving period of a head exclusive of a time during recording is made equal to a multiple of n times (for example, 1 or 2) the vertical synchronizing period, and an electronic shutter pulse is output during the moving period of the head. It becomes thereby possible to reduce the time wasted after the moving of the head until the output timing of the next electronic shutter pulse.

Furthermore, since an electronic shutter having less electric power consumption than a mechanical shutter is used, it is possible to simultaneously perform exposure and the moving of the head, and high-speed successive photographing operations become possible even while reducing electric power consumption.

The individual components shown in outline or designated by blocks in the drawings are all well known in the electronic camera arts and their specific construction and operation is not critical to the operation or best mode for carrying out the invention.

While the present invention has been described with respect to what is presently considered the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An electronic camera for recording an image of an object on a recording medium by using a moving head and an imaging device, said camera comprising:
   electronic pulse generation means for electronically outputting a signal to cause a signal stored in the imaging device to be read out to the moving head in a first time period;
   head moving means for moving said head relative to the medium; and
   control means, coupled to said electronic pulse generating means and to said head moving means, for controlling said head moving means so that a time required for moving the head to a subsequent track after recording is within a second time period equal to n times (where n is an integer) a vertical synchronizing period of a video synchronizing signal, said control means causing an exposure time for obtaining an image signal for a next frame to overlap with said second time period.

2. An electronic camera according to claim 1, wherein said head moving means includes a stepping motor, and wherein said control means outputs a pulse to said stepping motor, said pulse being completed within one period of said vertical synchronizing period.

3. An electronic camera according to claim 1, wherein said control means comprises a microcomputer.

4. An electronic camera according to claim 1, wherein said head moving means comprises a stepping motor.

5. An electronic camera according to claim 1, wherein said n is 2.

6. An electronic camera according to claim 1, wherein said imaging device comprises a CCD.

7. An electronic camera for recording an image of an object on a recording medium using a moving head and an imaging device, said camera comprising:
   electronic pulse generation means for electronically outputting a signal for causing a signal stored in the imaging device to be output to the moving head during a first period of time;
   head moving means for moving said head relative to the medium; and
   control means, coupled to said pulse generation means and to said head moving means, for causing an exposure period of the imaging device to overlap with a period of time during which said head moving means moves said head to a subsequent track.

8. An electronic camera according to claim 7, wherein said control means is a microcomputer.

9. An electronic camera according to claim 7, wherein said head moving means comprises a stepping motor.

10. An electronic camera according to claim 8, wherein said control means causes a time for settling oscillation of the head during the movement of the head to be included within said second period of time.

11. An electronic camera according to claim 7, wherein said control means causes said second period of time to be set to a multiple of n times a vertical synchronizing period, where n is an integer.

12. An electronic camera according to claim 7, wherein said imaging device comprises a CCD.

13. An electronic camera for recording an image signal of an object obtained from an imaging device onto a recording medium using a moving head, according to a reference signal having a predetermined period, said camera comprising:
   a control circuit for causing the moving head to record the imaging signal on the recording medium within the predetermined period; and
   head moving means, coupled to said control circuit, for moving the head to a next recording position within a period equal to n times said predetermined period, where n is an integer;
   said control circuit causing an exposure time for obtaining an image signal for a subsequent image signal to overlap with a period for moving said head to the next recording position.

14. An electronic camera according to claim 13, wherein said predetermined period is one vertical synchronizing period.

15. An electronic camera according to claim 13, wherein said n is 2.

16. An electronic camera according to claim 13, wherein said imaging device comprises a CCD.

17. An electronic camera comprising:
   (a) an imaging device for converting an imaging light of an object into an electric image signal;
   (b) a head for recording said image signal on a recording medium;
   (c) setting means for setting a predetermined period required for recording an image signal for one frame of the object;
   (d) timing control means, coupled to said setting means, for controlling a recording timing of said image signal in accordance with said setting means;
   (e) moving means, coupled to said timing control means, for moving said head to a next recording position within a period equal to n times said predetermined period, where n is an integer; and
   (f) rotation means for rotating said recording medium, and wherein said setting means comprises a magnet disposed on said recording medium and a coil provided at said rotation means.

18. An electronic camera according to claim 17, wherein said recording medium comprises a magnetic sheet rotated at a predetermined speed.

19. An electronic camera according to claim 17, wherein said timing control means is a microcomputer.

20. An electronic camera according to claim 17, wherein said moving means comprises a stepping motor.

21. An electronic camera according to claim 17, wherein said timing control means causes an exposure time for obtaining an image signal for a next one frame to overlap with said predetermined period.

22. An electronic camera according to claim 17, wherein said n is 2.

23. An electronic camera according to claim 17, wherein said imaging device comprises a CCD.

* * * * *

UNITED STATES PATENT AND TRADEMARK OFFICE
CERTIFICATE OF CORRECTION

PATENT NO. : 5,150,219
DATED : September 22, 1992
INVENTOR(S) : NOBUO FUKUSHIMA

It is certified that error appears in the above-identified patent and that said Letters Patent is hereby corrected as shown below:

COLUMN 7:

Line 66, "claim 8," should read --claim 7,--.

COLUMN 5:

Line 21, "televion" should read --television--.

COLUMN 5:

Line 23, "perfomed" should read --performed--.

Signed and Sealed this

Twenty-sixth Day of October, 1993

BRUCE LEHMAN

Attest:

Attesting Officer

Commissioner of Patents and Trademarks